US005646804A

United States Patent [19]
Backer et al.

[11] Patent Number: 5,646,804
[45] Date of Patent: Jul. 8, 1997

[54] THIN FILM MAGNETIC HEAD HAVING POLYMER ON BROKEN FLUX GUIDE SECTIONS, METHOD OF PRODUCING AND INTEGRATED STRUCTURE INCORPORATING SAME

[75] Inventors: Todd Backer, Apple Valley; Arthur Calderon, Minnetonka, both of Minn.; Wei Cheng Hsie, Worcester, Mass.; William P. Wood, Edina, Minn.; Terry Mitchell, Goleta, Calif.

[73] Assignee: Philips Electronics North America Corporation, New York, N.Y.

[21] Appl. No.: 811,556

[22] Filed: Dec. 20, 1991

Related U.S. Application Data

[63] Continuation-in-part of Ser. No. 703,539, May 21, 1991, abandoned.

[51] Int. Cl.⁶ ............................. G11B 5/39; G11B 5/31
[52] U.S. Cl. ............................................. 360/113; 360/126
[58] Field of Search ..................................... 360/113, 119, 360/125, 126; 156/652, 659.1

[56] References Cited

U.S. PATENT DOCUMENTS

| | | | |
|---|---|---|---|
| 4,617,600 | 10/1986 | Somers | 360/113 |
| 4,750,070 | 6/1988 | Maruyama | 360/125 |
| 4,757,410 | 7/1988 | Seko et al. | 360/113 |
| 4,825,318 | 4/1989 | Hoo et al. | 360/126 |
| 4,829,659 | 5/1989 | Deroux-Daughin | 156/652 |
| 4,841,399 | 6/1989 | Kitada et al. | 360/113 |
| 4,875,124 | 10/1989 | Dickstein et al. | 360/126 |
| 4,881,144 | 11/1989 | Yuito et al. | 360/126 |
| 5,032,943 | 7/1991 | Katsumata et al. | 360/113 |
| 5,032,944 | 7/1991 | Ohdoi | 360/126 |
| 5,111,352 | 5/1992 | Das et al. | 360/113 |
| 5,115,364 | 5/1992 | Somers | 360/113 |

FOREIGN PATENT DOCUMENTS

| | | |
|---|---|---|
| 61-032215 | 4/1986 | Japan . |
| 2005219 | 3/1990 | Japan . |

*Primary Examiner*—Jefferson Evans
*Attorney, Agent, or Firm*—John C. Fox

[57] ABSTRACT

In a thin film magnetic head comprising a magnetoresistive sensing element (MRE) located inwardly from the head face, a first section of a broken flux guide extending inwardly from the head face to overlie one peripheral edge portion of the MRE, and a second section overlying an opposite peripheral edge portion of the MRE, the space overlying the MRE between the flux guide sections is filled with a poller such as a photoresist, providing a smooth surface for a test/bias conductor, reducing shorts due to inadequate step coverage, and providing mechanical stress relief, leading to improved stability of the MRE.

10 Claims, 2 Drawing Sheets

THIN FILM MAGNETIC HEAD HAVING POLYMER ON BROKEN FLUX GUIDE SECTIONS, METHOD OF PRODUCING AND INTEGRATED STRUCTURE INCORPORATING SAME

CROSS REFERENCE TO RELATED APPLICATIONS

This application is a continuation-in-part of U.S. patent application Ser. No. 703,539 (PHA 21,669) filed May 21, 1991, now abandoned in view of continuation application Ser. No. 082,895 filed Jun. 25, 1993.

BACKGROUND OF THE INVENTION

This invention relates to thin film magnetic heads, and more particularly relates to such heads having a magnetoresistive sensing element (MRE) located inwardly from the head face, referred to herein generally as magnetoresistive heads; and also relates to a method of producing such heads, and to integrated structures incorporating them.

Magnetoresistive heads typically include a strip-shaped element of a ferromagnetic, metallic, magnetically anisotropic material, for example NiFe, commercially known as Permalloy, which is deposited as a thin film on a substrate and positioned either with one of its edges in the immediate proximity of a magnetic recording medium such as a tape, or alternatively, remotely from the medium with a flux guide arranged to bring the magnetic fields of the medium to the element. The fields of the recording medium produce variations in the magnetization of this magnetoresistive element (MRE) and thereby modulate the resistance of the element via the magnetoresistive effect. In order to measure the changing resistance of the MRE, the element is electrically biased. This is typically done by directing an electric current through the element. Detection circuitry is then connected to the element so that the changing resistance of the element can be monitored to produce an output which is representative of the information stored on the medium.

Thin film magnetoresistive heads are being developed which offer the advantages of miniaturization and integration on a single substrate. In the case of magnetic audio tape, information is written onto, and read from, spaced, parallel tracks on the tape. To increase information density, the width of the tracks, as well as the spacing between the tracks, can be reduced. For example, in the newly proposed audio format for digital compact cassettes (dcc), there are a total of 18 separate, parallel tracks on a tape having the same width as the conventional compact cassette tape.

In order to achieve magnetic heads having correspondingly small dimensions, such heads are now being developed using thin film processing techniques of the type used to manufacture integrated circuits in silicon substrates.

Not surprisingly, problems arise in the manufacture of such heads which are similar to problems encountered in the fabrication of some multilayer integrated circuits. For example, as the size of the heads is reduced, the thicknesses of the various layers become more significant. Particularly at the edges of layers, problems known as "step coverage" can occur. For example, inadequate coverage of a step of a conductive layer by an insulating layer can lead to damaging shorts between the conductive layer and an overlying conductive layer. Conversely, inadequate coverage of an insulating step by a conductive layer can lead to discontinuities in the conductive layer.

In the case of thin film heads having broken flux guides, the edges of the flux guide sections can give rise to such step coverage problems. For example, a thin test/bias conductor is typically formed on the insulating layer which covers the flux guide sections. Inadequate step coverage at the edges of the flux guide sections can lead to shorts between one or both of these sections and the test/bias conductor. Furthermore, the insulating layer itself will have steps, caused by following the contours of the underlying structure. Inadequate coverage of these steps by the test/bias conductor layer can cause discontinuities in this layer.

A problem associated with prior art magnetoresistive heads has been the presence of Barkhausen noise in the output of the heads caused by the erratic movement of magnetic domain walls in the MRE and their associated flux guides in response to the changing magnetic fields of the tape. Such Barkhausen noise in the MRE can be substantially eliminated by maintaining single domain magnetization in the read portion, or active region, of the MRE. However, stability of this single domain structure can be jeopardized by mechanical stresses in the MRE, caused for example, by stresses in adjacent layers created during manufacture.

The stability of the flux guides can be increased by increasing their thickness, thereby making it more difficult to move the domain walls. However, such a measure aggravates the step problem described above.

OBJECTS AND SUMMARY OF THE INVENTION

Accordingly, it is an object of the invention to provide a thin film magnetic head having an MRE positioned inwardly from the head face in which the chance of shorts occurring between the MRE and an overlying test/bias conductor is reduced.

It is another object of the invention to provide such a head in which the chance of discontinuities occurring in such a test/bias conductor is reduced.

It is still another object of the invention to provide such a head in which the chance of mechanical stresses occurring in the MRE is reduced.

It is a still further object of the invention to provide such a head in which the thickness of the lower flux guides can be increased.

It is a still further object of the invention to provide a row of such thin film heads integrated on a single substrate.

In accordance with the invention, a thin film magnetic head having a non-magnetic substrate, a head face normal to the plane of the substrate, a magnetoresistive sensing element located on the substrate inwardly from the head face, and a flux guide broken into two sections, a first section extending inwardly from the head face to overlie a peripheral edge portion of the magnetoresistive element, and a second section spaced apart from the first section and overlying an opposite peripheral edge portion of the magnetoresistive element; is characterized in that a polymer layer overlies the magnetoresistive element and the broken flux guide sections, at least in the region of the space between the flux guide sections.

In one embodiment of the invention, the magnetoresistive element is separated from the overlying flux guide sections by an electrically insulating layer, and the polymer layer is located on the broken flux guide sections and the exposed portion of the insulating layer in the space between these sections. In addition, a test/bias conductor may be located on the polymer layer.

Preferably, the thin film magnetic head is a read head having a second electrically insulating layer extending from the head face and located on the test/bias conductor, the exposed portions of the underlying polymer layer and the broken flux guide sections; and a continuous flux guide located on the second insulating layer; the portion of the second insulating layer between the flux guides adjacent the head face defining a read gap.

In accordance with another embodiment of the invention, the thin film magnetic head is a combined read/write head in which a second continuous flux guide is located over the first continuous flux guide, and a third insulating layer is located between these flux guides, the portion of the third insulating layer adjacent the head face defining a write gap, and the first continuous flux guide acting as a shared flux guide for the read and write portions of the head.

Preferably, a write coil is located between the continuous flux guides.

In accordance with still another embodiment of the invention, an integrated thin film magnetic head structure comprises a plurality of thin film magnetic heads of any of the previously described embodiments, the heads arranged in a row on a single substrate.

In accordance with another aspect of the invention, a method is provided for producing a thin film magnetic head having a non-magnetic substrate and a head face normal to the plane of the substrate, the method comprising the steps of:

(a) forming a magnetoresistive sensing element on the substrate;

(b) forming a layer of an electrically insulating material on the MRE;

(c) forming a flux guide layer on the insulating layer;

(d) removing a portion of the flux guide layer overlying the MRE, to produce first and second flux guide sections;

characterized by:

(e) forming a layer of a flowable, polymerizable, material on top of the broken flux guide sections and the exposed portion of the insulating layer between the sections; and (f) polymerizing the polymerizable material.

Preferably, the layer of the polymerizable material is formed over the entire surface of the head, after which portions of the layer beyond the region of the space between the broken flux guide sections are removed. Most preferably, the polymerizable material is a photoresist, and the layer of photoresist is selectively exposed (e.g., through a mask) to insolubilize the region of the space between the broken flux guide sections, after which the non-exposed and thus still soluble portions are washed away.

DESCRIPTION OF THE PREFERRED EMBODIMENTS

Figure 1:
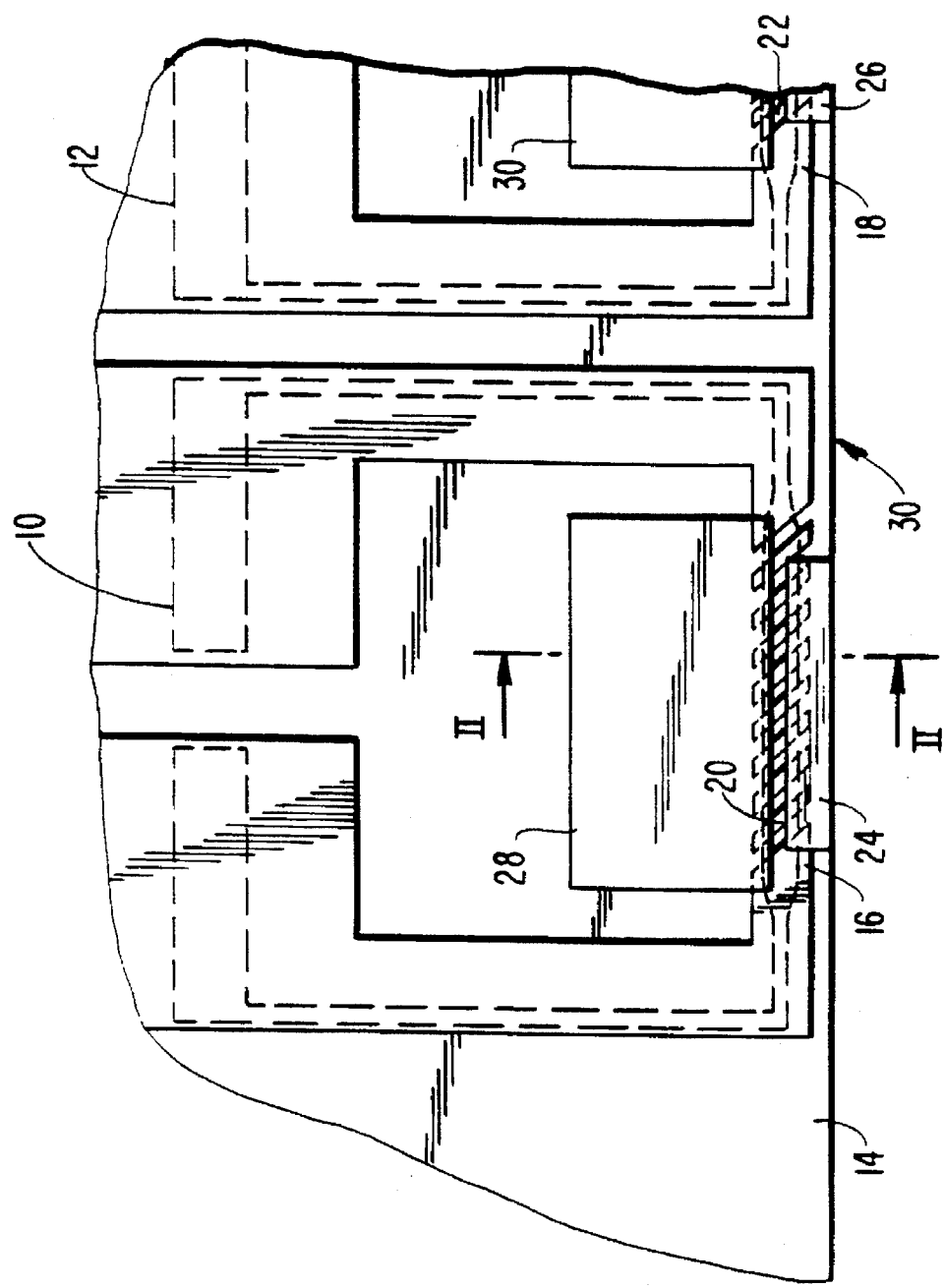
FIG. 1 is a plan view of a portion of a row of thin film magnetic read heads incorporating MREs.

In one aspect of the invention, polymer layers of the invention are incorporated into thin film magnetic heads, especially in integrated structures including a plurality of such heads arranged in a row on a single substrate. A plan view of a portion of such a structure is shown in FIG. 1, in which MREs 10 and 12 are formed on a non-magnetic substrate 14. Formed on top of the MREs are barberpole structures 16 and 18, having the known function of canting the direction of the sense current relative to the easy axis of magnetization in the MRE. On top of the barberpoles, separated by an insulating layer, are broken flux guides including front sections 24 and 26 and rear sections 28 and 30. The front sections 24 and 26 intersect the head face 30, and together with the rear sections 28 and 30, overlap slightly the front and rear edges, respectively, of the main body portions 20 and 22 of MREs 10 and 12. Together with another flux guide, not shown, these flux guides serve to conduct magnetic flux from the tape to the MRE.

Figure 2:
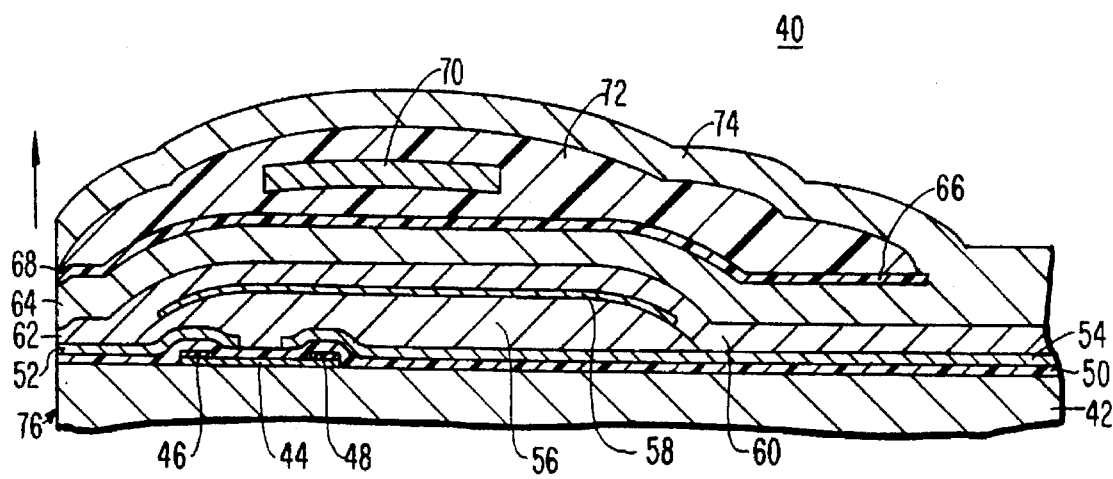
FIG. 2 is a section view of a thin film magnetic read/write head incorporating a polymer layer in accordance with the invention, corresponding to a section along line II—II of FIG. 1.

FIG. 2 shows a combined read/write thin film magnetic head 40, in a section view corresponding to a section taken along line II—II of FIG. 1, in which the structure shown in FIG. 1 constitutes a portion of the read head. The combined head 40 is a multilayer structure formed on a non-magnetic substrate 42. MRE 44 is formed on the substrate surface, which may include one or more surface-smoothing layers (not shown), as described in co-pending U.S. patent application Ser. No. 082,895 filed Jun. 25, 1993, and allowed co-pending continuation-in-part application Ser. No. 07/801,241, filed Dec. 3, 1991, now U.S. Pat. No. 5,269,895, both assigned to the present assignee. Barberpole 46, 48 is formed on top of MRE 44, and insulating layer 50 is formed on top of substrate 42, MRE 44, and barberpole 46, 48. Front and rear broken flux guide sections 52 and 54 formed on top of insulating layer 50, overlie and slightly overlap the MRE/barberpole structure. Overlying the broken flux guide sections 52, 54 is polymer layer 56, which fills in the space between flux guide sections 52, 54, and provides a smooth upper surface for test/bias conductor 58. Insulating layer 60 separates the test/bias conductor from flux guide 64, which together with the broken flux guide and the MRE form a continuous flux path with the magnetic tape, not shown, which moves across head face 76 in the direction of the arrow. Layer 60 also defines the read gap 62.

Overlying flux guide 64, which is shared by the read and write portions of the head, is write coil 70, which generates the magnetic flux needed to write information on the tape. Top flux guide 74 extends from the head face 76 over write coil 70 to join with flux guide 64 to form a path for guiding flux from the coil 70 to the tape. Insulating layer 66 defines the write gap 68. Separate insulating layer 72 surrounds and insulates coil 70 of the write portion of the head.

A more detailed description of the functions of the various elements of the read/write head and methods and materials for producing them may be found in the above-referenced co-pending applications.

In accordance with one embodiment of another aspect of the invention, the polymer layer is produced by a method which includes forming a layer of a flowable, polymerizable material, such as photoresist, over the broken flux guide sections 52 and 54, and allowing the material to flow into the space between the flux guide sections. As is known, a convenient way of achieving a uniform coating is to spin the workpiece after application of the photoresist, to allow spreading of the material by the action of centrifugal force. Following application of the layer, it is polymerized or cured in the known manner, for example, by heating or irradiating the layer.

Because the head face is subject to wear from contact with the moving surface of the magnetic tape, it is preferable to use a wear resistant material to define the read and write gaps, such as an oxide. Thus, where the polymer layer has been formed over the entire surface, or at least up to the head face, it will normally be found advantageous to remove a portion of the layer from the region of the head face, so that the subsequently applied insulating layer 60 can define the read gap at 62.

Where the polymer is a photoresist, it will be found convenient to form the layer over the entire surface, after which a portion of the layer in the region of the space between the flux guide sections is insolubilized in the known manner, by exposure to actinic radiation, for example, through a mask. Following this, the masked and thus non-exposed, still soluble portions are removed by washing in the known manner.

Due to the flowable nature of the polymer material when it is first applied, it is able to conform its lower surface to the contours of the underlying structure, while surface tension in the layer results in the upper surface of the polymer layer being relatively smooth. Thus, a smooth surface is provided for the subsequent formation of the test/bias conductor. If an oxide layer were instead formed directly on the broken flux guide sections, the upper surface of the oxide would follow the contours of the underlying surface, thus providing a stepped surface which would increase the likelihood of shorts between the flux guide sections and the test/bias conductor, and of discontinuities in the test/bias conductor. With the polymer layer formed as described, the likelihood of such shorts and discontinuities is considerably reduced or substantially avoided.

Another advantage of using a polymer at this location in the structure is that it can alleviate mechanical stresses between the more rigid metal and oxide layers in the vicinity of the MRE. As previously explained, such mechanical stresses can threaten the stability of the single domain active region of the MRE. The placement of the polymer layer between the metal MRE and insulating oxide layer 60 thus reduces or prevents mechanical stresses which could otherwise occur between these dissimilar layers.

Still another advantage of the invention is that the thickness of the lower flux guides can be increased, thereby increasing the stability of their magnetic domains.

The thickness of the polymer layer should be kept as small as possible, consistent with maintaining the required electrical insulation between the test/bias conductor and the lower flux guide in order to avoid needless increases in the total thickness of the head. Typical thicknesses of the polymer layer after curing are in the range of about 1-2 microns, and have resulted in dramatic decreases in the frequency of occurrence of shorting defects between the MRE and the test/bias conductor, for example, from 60 percent of heads produced having a structure without a polymer layer as shown in FIG. 3, to 10 percent of heads produced.

Figure 3:
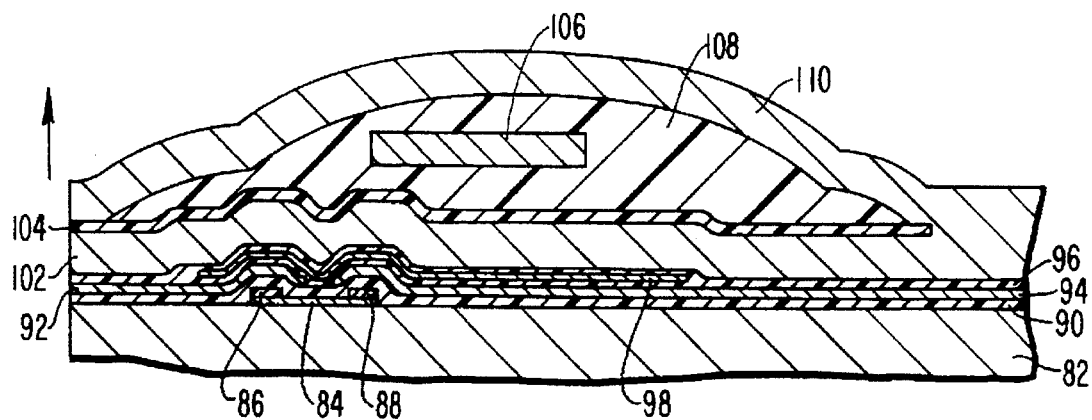
FIG. 3 is a section view of a thin film magnetic read/write head, corresponding to a section along line II—II of FIG. 1, not incorporating a polymer layer.

FIG. 3 is a view similar to that of FIG. 2, in which head 80, in a section view, is a multilayer structure formed on a non-magnetic substrate 82. MRE 84 is formed on the substrate surface, which may include one or more surface-smoothing layers (not shown). Barberpole 86, 88 is formed on top of MRE 84, and insulating layer 90 is formed on top of substrate 82, MRE and barberpole 86, 88. Front and rear broken flux guide sections 92 and 94 formed on top of insulating layer 90, overlie and slightly overlap the MRE/barberpole structure. Overlying the broken flux guide sections 92, 94 is insulting layer 96, which supports test/bias conductor 98.

Overlying flux guide 102, which is shared by the read and write portions of the head, is write coil 106. Top flux guide 110 extends from the head face over write coil 106 to join with the flux guide 102. Insulating layer 104 defines the write gap 98. Separate insulating layer 108 surrounds and insulates coil 106.

Additional embodiments and variations of the invention will become apparent to those skilled in the art, and are intended to be encompassed within the scope of the appended claims.

We claim:

1. A thin film magnetic head having: a nonmagnetic substrate; a head face normal to the plane of the substrate; a magnetoresistive sensing element located on the substrate inwardly from the head face; a flux guide broken into two sections, a first section extending inwardly from the head face to overlie a peripheral edge portion of the magnetoresistive element, and a second section spaced apart from the first section and overlying an opposite peripheral edge portion of the magnetoresistive element, an electrically insulating layer separating the magnetoresistive element from the flux guide sections; characterized in that a polymer layer having a smooth upper surface overlies the magnetoresistive element and is located on the broken flux guide sections and the exposed portion of the insulating layer in the space between these sections, and in that a test/bias conductor is located on the polymer layer.

2. The thin film magnetic head of claim 1 in which; a second electrically insulating layer is located on the test/bias conductor, the exposed portions of the underlying polymer layer and the broken flux guide sections; and a continuous flux guide is located on the second insulating layer; the portion of the second insulating layer between the flux guides adjacent the head face defining a read gap.

3. The thin film magnetic head of claim 2 in which a second continuous flux guide is located over the first continuous flux guide, and a third insulating layer is located between these flux guides, the portion of the third insulating layer adjacent the head face defining a write gap.

4. The thin film magnetic head of claim 3 in which a write coil is located between the continuous flux guides.

5. An integrated thin film magnetic head structure comprising a plurality of thin film magnetic heads of any of the previous claims, the heads arranged in a row on a single substrate.

6. The thin film magnetic head of claim 1 in which the polymer is a photoresist.

7. A method of producing a thin film magnetic head having a non-magnetic substrate and a head face normal to the plane of the substrate, the method comprising the steps of:

(a) forming a magnetoresistive sensing element on the substrate;

(b) forming a layer of an electrically insulating material on the MRE;

(c) forming a flux guide layer on the insulating layer;

(d) removing a portion of the flux guide layer overlying the MRE, to produce first and second flux guide sections;

characterized by:

(e) forming a layer of a flowable, polymerizable, material on top of the broken flux guide sections and the exposed portion of the insulating layer between the sections; and (f) polymerizing the polymerizable material.

8. The method of claim 7 in which the layer of the polymerizable material is formed over the entire surface of the head, after which portions of the layer beyond the region of the space between the broken flux guide sections are removed.

9. The method of claim 8 in which the polymerizable material is a photoresist.

10. The method of claim 9 in which the layer of photoresist is exposed through a mask to insolubilize the region of the space between the broken flux guide sections, after which the non-exposed and thus still soluble portions are washed away.

* * * * *